(12) United States Patent
Shinohara

(10) Patent No.: US 6,493,157 B1
(45) Date of Patent: Dec. 10, 2002

(54) IMAGE-CAPTURING LENS

(75) Inventor: Yoshikazu Shinohara, Saitama (JP)

(73) Assignee: Fuji Photo Optical Co., Ltd., Saitama (JP)

(*) Notice: Subject to any disclaimer, the term of this patent is extended or adjusted under 35 U.S.C. 154(b) by 0 days.

(21) Appl. No.: 10/096,966

(22) Filed: Mar. 14, 2002

(30) Foreign Application Priority Data

Apr. 2, 2001 (JP) ........................................ 2001-103596

(51) Int. Cl.$^7$ ..................... G02B 13/04; G02B 13/02; G02B 9/64
(52) U.S. Cl. ..................... 359/751; 359/748; 359/755
(58) Field of Search ..................... 359/691, 748–755

(56) References Cited

U.S. PATENT DOCUMENTS

| | | | |
|---|---|---|---|
| 5,790,324 A | 8/1998 | Park | 359/751 |
| 5,803,349 A * | 9/1998 | Sato | 359/682 |
| 5,886,835 A * | 3/1999 | Suzuki et al. | 359/782 |

* cited by examiner

*Primary Examiner*—Georgia Epps
*Assistant Examiner*—William Choi
(74) *Attorney, Agent, or Firm*—Arnold International; Bruce Y. Arnold (57) ABSTRACT

An image-capturing lens is formed of front and rear lens groups having negative and positive refractive power, respectively, in order from the object side. The rear lens group is formed of, in relative sequential order from the most object side of the rear lens group, a biconvex lens element that is cemented to a biconcave lens element, a biconvex lens element, and a biconvex lens element. A specified condition is satisfied so as to make the cemented lens of the rear lens group insensitive to de-centering errors which may occur either in making the cemented lens or in assembling the image-capturing lens.

5 Claims, 8 Drawing Sheets

IMAGE-CAPTURING LENS

BACKGROUND OF THE INVENTION

Image reading devices have been conventionally developed in which an image of an original is formed on a light receiving element such as a CCD (charge-coupled device) array by means of an optical system and the image data is read out. Image-reading devices may be used in devices other than facsimile and copy machines, such as projectors which display the read image data at a surface. The image data is often enlarged by being projected onto a screen. When the captured image has distortion or insufficient image resolution, these deficiencies of the image are made more apparent by projection enlargement. Therefore, a specialized imaging lens (hereinafter termed an image-capturing lens) having low distortion and high resolution is required for this kind of image-reading device.

There are also demands for compactness, high reading speed, and low price for image-reading devices. Accordingly, compactness, low price, and improved brightness are required for the image-capturing lens used with such an image-reading device.

In this circumstance, using fewer lenses allows downsizing of the image-capturing lens. However, using fewer lenses, on the other hand, requires improved manufacturing precision for the lenses, leading to difficulty in production. In particular, in order to obtain low distortion and high resolution for the projector described above, lens elements of the image-capturing lens have to be produced and assembled with high precision. Many lenses do not meet the necessary high standards for manufacture and assembly. Thus, production and assembly costs are high.

BRIEF SUMMARY OF THE INVENTION

The present invention relates to an image-capturing lens that, for example, may be used to form an image on a CCD array, with the output from the CCD array being used to project a magnified image of the original. The object of the present invention is to provide an image-capturing lens having high optical performance, since the aberrations of the image-capturing lens are magnified by the projection of the image data that is read using the image-capturing lens and CCD array.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The image-capturing lens according to the present invention is formed of, in order from the object side, a front lens group having negative refractive power and a rear lens group having positive refractive power. The rear lens group is formed of, in sequential order from the object side of the rear lens group, a first lens element that is biconvex and is cemented to a second lens element that is biconcave, a third lens element that is biconvex, and a fourth lens element that is biconvex, wherein the following Condition (1) is satisfied:

$$|\beta 5+\beta 6|\leq 0.3 \qquad \text{Condition (1)}$$

where $\beta 5=(1-b5)(b6)(b7)(b8)$ and $\beta 6=(1-b6)(b7)(b8)$ with b5, b6, b7, and b8 being the transverse magnification of the first, second, third, and fourth lens elements in the rear lens group, respectively.

Condition (1) above controls the sensitivity of the cemented lens in the rear lens group to de-centering.

The cemented lens of the rear lens group has a sensitivity to de-centering that is determined by the absolute value of the sum of $\beta 5$ and $\beta 6$, as defined above. Condition (1) requires that this sensitivity to de-centering be no more than 0.3. Desirable, the sensitivity should betas close to zero as possible.

The front lens group of the image-capturing lens according to the present invention preferably is formed of, in order from the object side, a first lens element L1 having a meniscus shape and positive refractive power with its convex surface on the object side, a second lens element L2 having a meniscus shape and negative refractive power with its convex surface on the object side, a third lens element L3 that is biconcave, and a fourth lens element L4 having a meniscus shape and a positive refractive power with its convex surface on the image side. Further, it is preferable that the following Condition (2) be satisfied:

$$0.5\leq f1/(Lt+bf)\leq 1.5 \qquad \text{Condition (2)}$$

where f1 is the focal length of the first lens element,

Lt is the overall length of the image-capturing lens, and bf is the back focus of the image-capturing lens.

It is further preferable that the following Condition (3) be satisfied:

$$|h5/h1|<0.05 \qquad \text{Condition (3)}$$

where h5 is the height of the principal ray at the first lens element of the rear lens group, and h1 is the height of the principal ray at the first lens element of the front lens group.

More specifically h5 is the distance from the optical axis that a ray from infinity which passes through the center of an aperture stop enters the first lens element of the rear lens group, and h1 is the distance from the optical axis that a ray from infinity which passes through the center of the aperture stop enters the lens element L1.

The invention will first be described in general terms with reference to a drawing figure for an embodiment of the invention.

Figure 1:
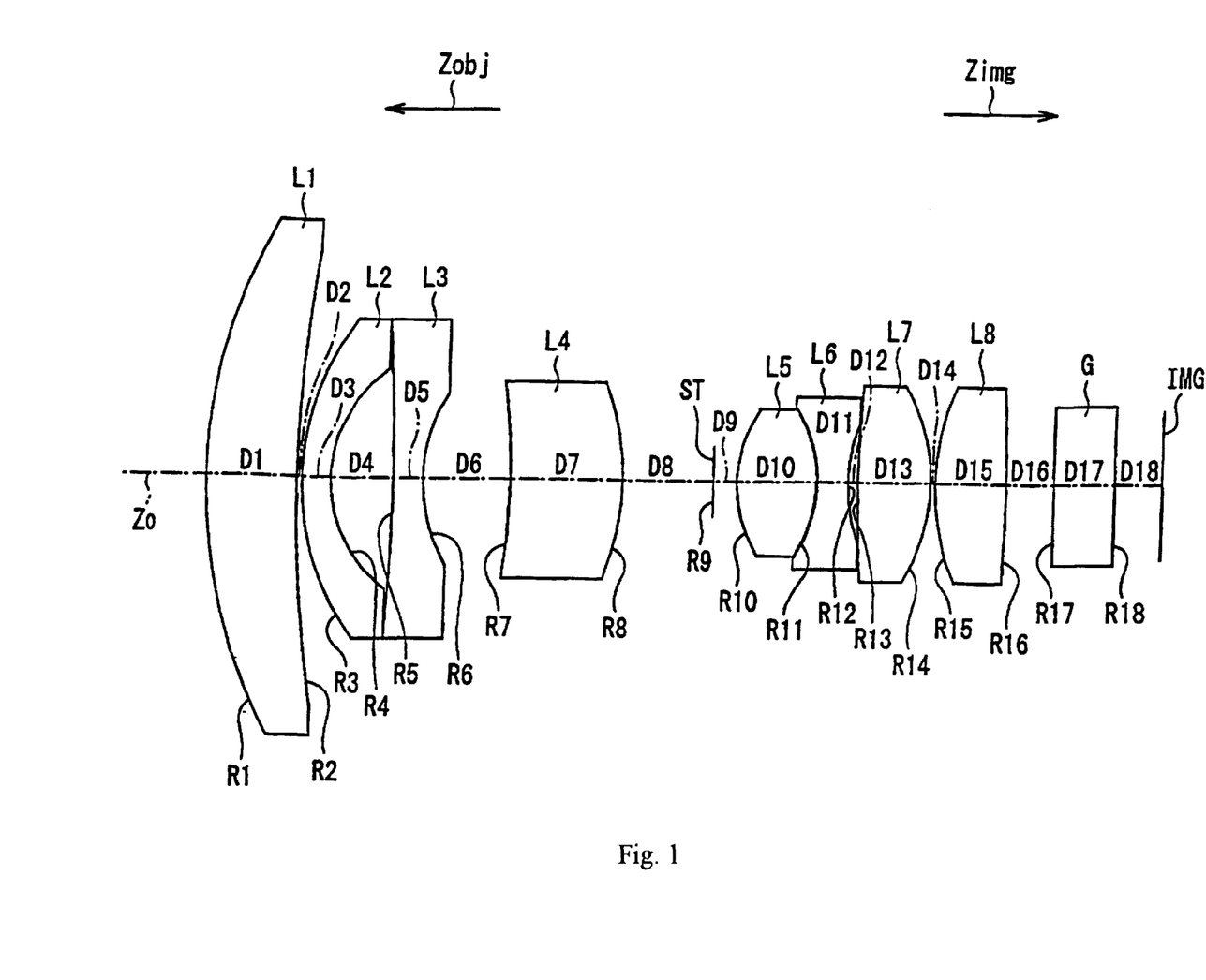
FIG. 1 shows the basic lens element configuration of the image-capturing lens according to Embodiment 1.

FIG. 1 shows the basic lens element configuration of the image-capturing lens of an embodiment of the present invention, depicting a sectional view of the lens elements. The object-side direction is labeled $Z_{obj}$, the image-side direction is labeled $Z_{img}$, Zo is the optical axis, and ST is a stop.

The image-capturing lens of this embodiment is used with a projection apparatus that reads an image on an original and enlarges the image by projecting a displayed image of the captured image data onto a screen. An image detecting device, such as a CCD array, is used in the apparatus to capture the image data of the image formed by the image-capturing lens of the invention. The image-capturing lens is formed of a front lens group that is positioned on the object side of the stop, and a rear lens group that is positioned on the image side of the stop. A cover glass G may be positioned between the eighth lens element L8 and the image plane IMG, in order to protect an image-detecting device that is normally positioned at the image plane, and also may support a filter, such as an infrared blocking filter.

The front lens group is formed of, in order from the object side, lens elements L1–L4. The first lens element L1 has positive refractive power and a meniscus shape with its convex surface on the object side. The second lens element L2 has negative refractive power and a meniscus shape with its convex surface on the object side. The third lens element L3 is biconcave. The fourth lens element L4 has positive refractive power and a meniscus shape with its convex surface on the image side.

The rear lens group is formed of, in order from the object side, lens elements L5–L8. The fifth lens element L5 is biconvex and cemented to the sixth lens element L6 which is biconcave so as to form a cemented lens L5, L6. The seventh lens element L7 and the eight lens element L8 each are biconvex.

In general, a lens positioned immediately after the aperture stop has a small principal ray height and, therefore, is often designed to have a small outer diameter. As a result, de-centering of this lens causes a significant influence on imaging performance of the entire optical system. Particularly, when the lens positioned immediately after the aperture stop is a cemented lens that is intended to be achromatic, as in the present invention, de-centering of the cemented lens usually results in a significantly deteriorated image quality.

The purpose of Conditions (1)–(3) will now be explained. Condition (1) controls the image quality sensitivity to de-centering the cemented lens of the rear lens group. When the upper limit of Condition (1) is not satisfied, de-centering the cemented lens affects the image quality to too great a degree, and results in excessive distortion and excessive curvature of field. Thus, excellent image quality cannot be maintained at the periphery of the image field, which results in performance deficiency. Therefore, the image-capturing lens is poorly suited for mass production and assembly of components. "De-centered" as used herein means that the axis that pass through the centers of curvature of the two surfaces of the lens element is not aligned with the mechanical axis that is geometrically determined by the outer diameter of the lens element.

When Condition (1) is satisfied, de-centering of the cemented lens L5, L6 will barely affect the optical performance of the image-capturing lens. In other words, even if the cemented lens L5, L6 is de-centered, either due to defective manufacture of this component or as a result of it being assembled into a barrel with poor precision, degradation of imaging performance will be minimal. Therefore, the image-capturing lens will be highly suitable for mass production.

Preferably, the value set forth in Condition (1) should be as near to zero as possible. When $\beta 5 \cong \beta 6$, the transverse magnification $\beta 5$ of the fifth lens element L5 and the transverse magnification $\beta 6$ of the sixth lens element L6 cancel each other. Therefore, when the optical axis of the cemented lens L5, L6 is de-centered from the optical axis $Z_O$ of the optical system, the affect of de-centering the fifth lens element L5 will be equal and opposite to that of de-centering the sixth lens element L6. Thus, the two affects cancel one another. As a result, de-centering the cemented lens will have little effect on the quality of the image produced by the image-capturing lens.

Condition (2) defines the ratio of the focal length of the first lens element as compared to the distance from the front surface of the image-capturing lens to the image surface IMG. Compared to a conventional image-capturing lens that is formed of, for example, three lens elements, the image-capturing lens of the present invention is formed of 5 additional lens elements. This could easily make the image-capturing lens of the invention too long. Thus, Condition (2) optimizes the overall lens length while maintaining favorable correction of aberrations. More specifically, when the lower limit of Condition (2) is exceeded, the power of the first lens element L1 is too weak, and results in the overall lens length becoming too long. On the other hand, when the upper limit of Condition (2) is exceeded, the various aberrations, especially spherical aberration, cannot be sufficiently corrected.

Condition (3) defines the ratio of the outer diameter of the fifth lens element L5 to the outer diameter of the first lens element L1. More specifically, the outer diameters of the first and fifth lens elements L1 and L5 are determined by the principal ray heights h1 and h5 as defined above. When the upper limit of Condition (3) is not satisfied, these outer diameters become excessive, resulting in the image-capturing lens becoming heavy, cumbersome, and expensive to produce.

Two embodiments of the invention will now be set forth in detail.

Embodiment 1

FIG. 1, discussed above in describing the invention in general terms, shows the basic lens element configuration of this embodiment.

Table 1 below lists the surface number #, in order from the object side, the radius of curvature R (in mm) of each surface, the on-axis spacing D (in mm) between surfaces, as well as the index of refraction $N_d$ and the Abbe number $v_d$ (both at the d-line) of each optical element of the image-capturing lens of Embodiment 1. In the middle portion of the table are listed the focal length f, the F-number $F_{NO}$, the overall lens length Lt, and the back focus bf of the image-capturing lens, as well as the focal length f1 of the first lens element, the lateral magnifications $\beta 5$ and $\beta 6$ of the fifth and sixth lens elements, respectively, the height h1 of the principal ray at the first lens element of the front lens group, and the height h5 of the principal ray at the first lens element of the rear lens group. In the lower portion of the table are listed the values that correspond conditions (1)–(3) above.

TABLE 1

| # | R | D | $N_d$ | $v_d$ |
|---|---|---|---|---|
| 1 | 20.8776 | 3.82 | 1.803965 | 46.6 |
| 2 | 55.5712 | 0.20 | | |

TABLE 1-continued

| # | R | D | $N_d$ | $\nu_d$ |
|---|---|---|---|---|
| 3 | 10.6699 | 1.20 | 1.83477 | 42.7 |
| 4 | 5.4204 | 2.61 | | |
| 5 | −81.5625 | 1.20 | 1.83477 | 42.7 |
| 6 | 6.6715 | 3.60 | | |
| 7 | −27.8214 | 4.77 | 1.846587 | 23.8 |
| 8 | −10.4965 | 4.79 | | |
| 9 | ∞ (stop) | 0.28 | | |
| 10 | 5.5157 | 3.28 | 1.574982 | 41.5 |
| 11 | −5.5157 | 1.26 | 1.846587 | 23.8 |
| 12 | 6.8498 | 0.43 | | |
| 13 | 51.5053 | 3.08 | 1.754971 | 52.3 |
| 14 | −7.4585 | 0.20 | | |
| 15 | 9.9991 | 2.93 | 1.772469 | 49.6 |
| 16 | −65.9881 | 2.00 | | |
| 17 | ∞ | 2.45 | 1.516314 | 64.1 |
| 18 | ∞ | 1.89 | | |
| 19 | ∞ | | | | f = 3.47    $F_{NO}$ = 2.8    Lt = 33.66    bf = 5.45
f1 = 39.9    $\beta 5$ = 0.895    $\beta 6$ = −1.182
h1 = −9.9    h5 = 0.394

Condition (1) value of ($\beta 5 + \beta 6$): 0.287
Condition (2) value of f1/(Lt + bf): 1.02
Condition (3) value of |h5/h1|: 0.04

As is apparent from comparing the above values with Conditions (1)–(3), this embodiment satisfies each of Conditions (1)–(3).

Figure 2A:
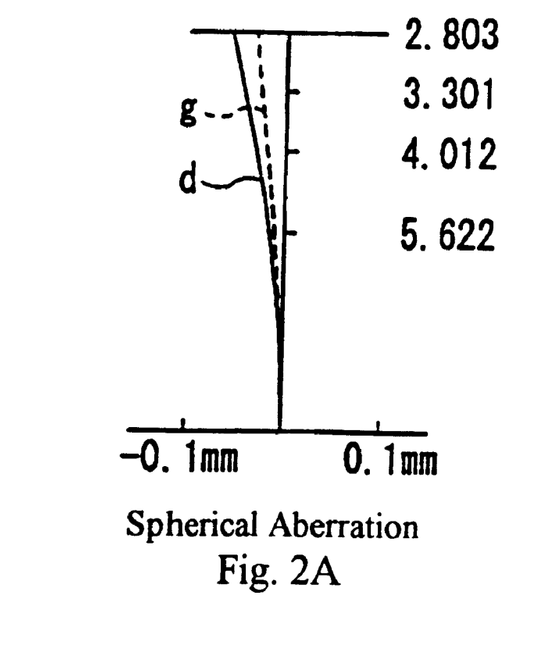
FIGS. 2A–2C show the spherical aberration, astigmatism, and distortion, respectively, of the image-capturing lens shown in FIG. 1.
Figure 2B:
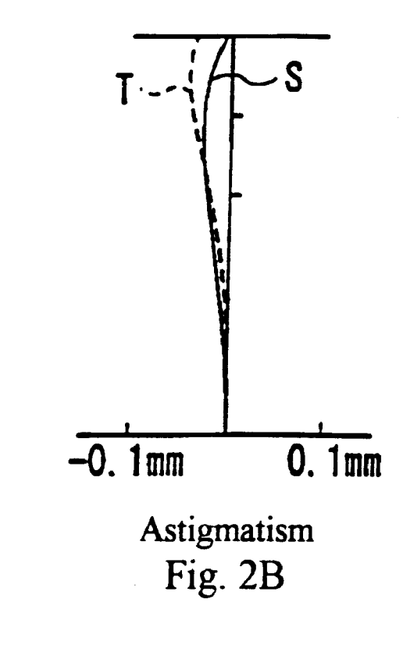
Figure 2C:
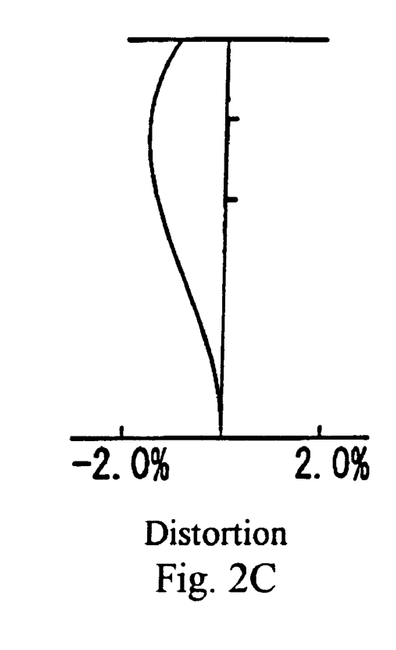

FIGS. 2A–2C show the spherical aberration, astigmatism, and distortion, respectively, of the image-capturing lens of Embodiment 1. In FIG. 2A, the spherical aberration is shown for the d line ($\lambda$=587.6 nm) and the g line ($\lambda$=435.8 nm). In FIG. 2B, the astigmatism is shown for both the sagittal S and tangential T image planes. As is apparent from these figures, the spherical aberration, astigmatism and distortion are each favorably corrected so as to provide a high quality image-capturing lens.

Figure 3:
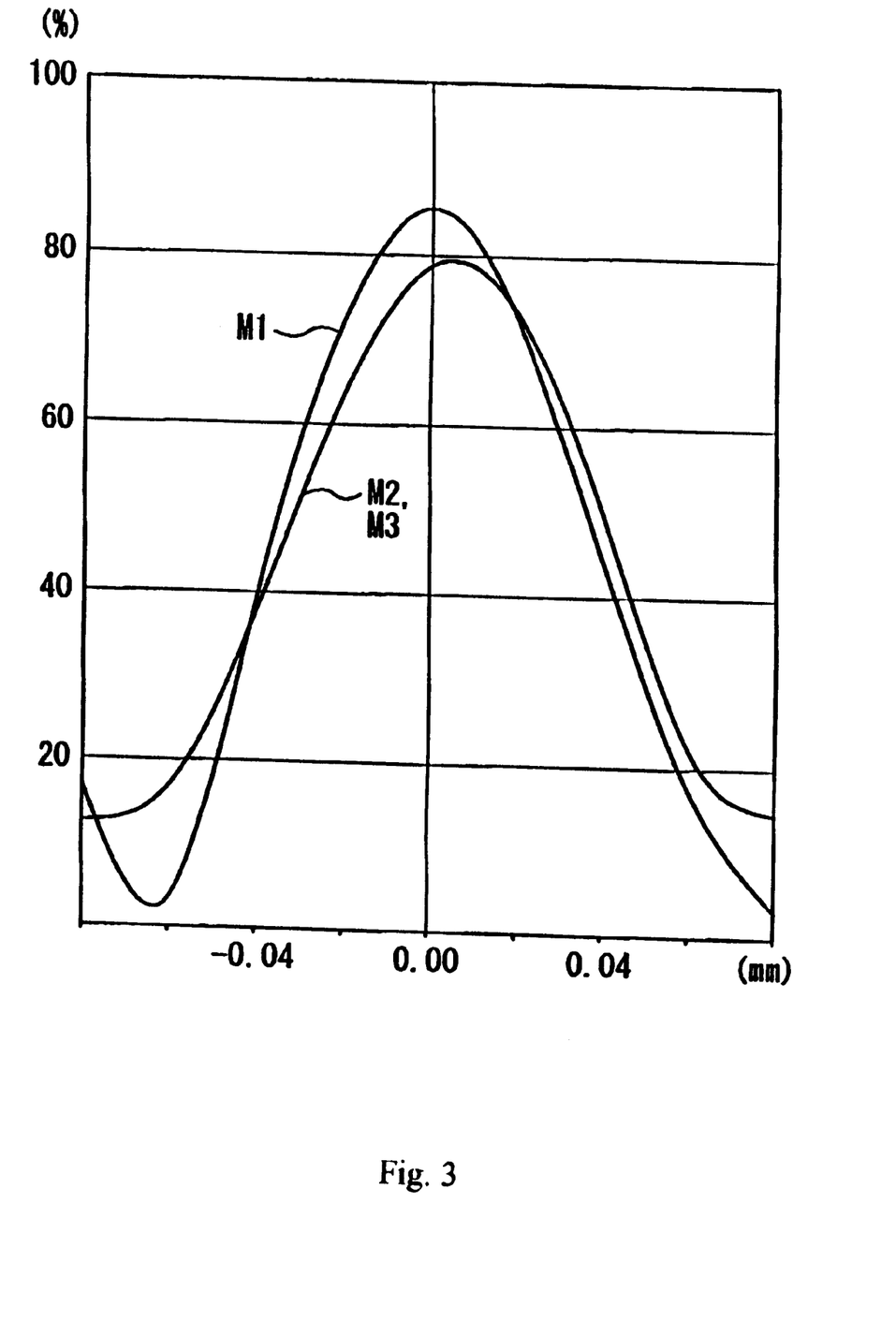
FIGS. 3–6 show how the image quality at three field angles M1–M3 of the image-capturing lens shown in FIG. 1 is affected by focusing error under different conditions.
Figure 4:
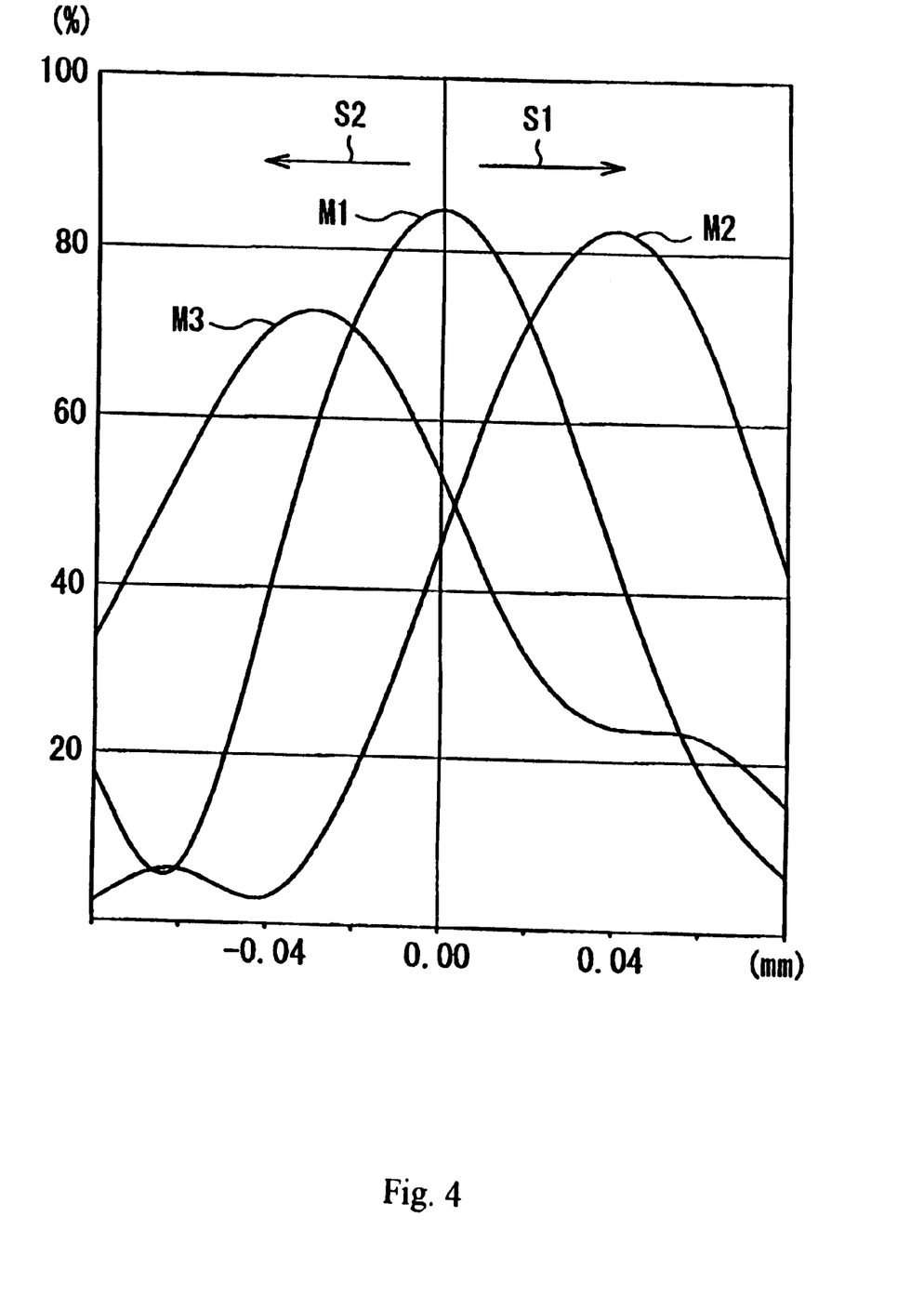
Figure 5:
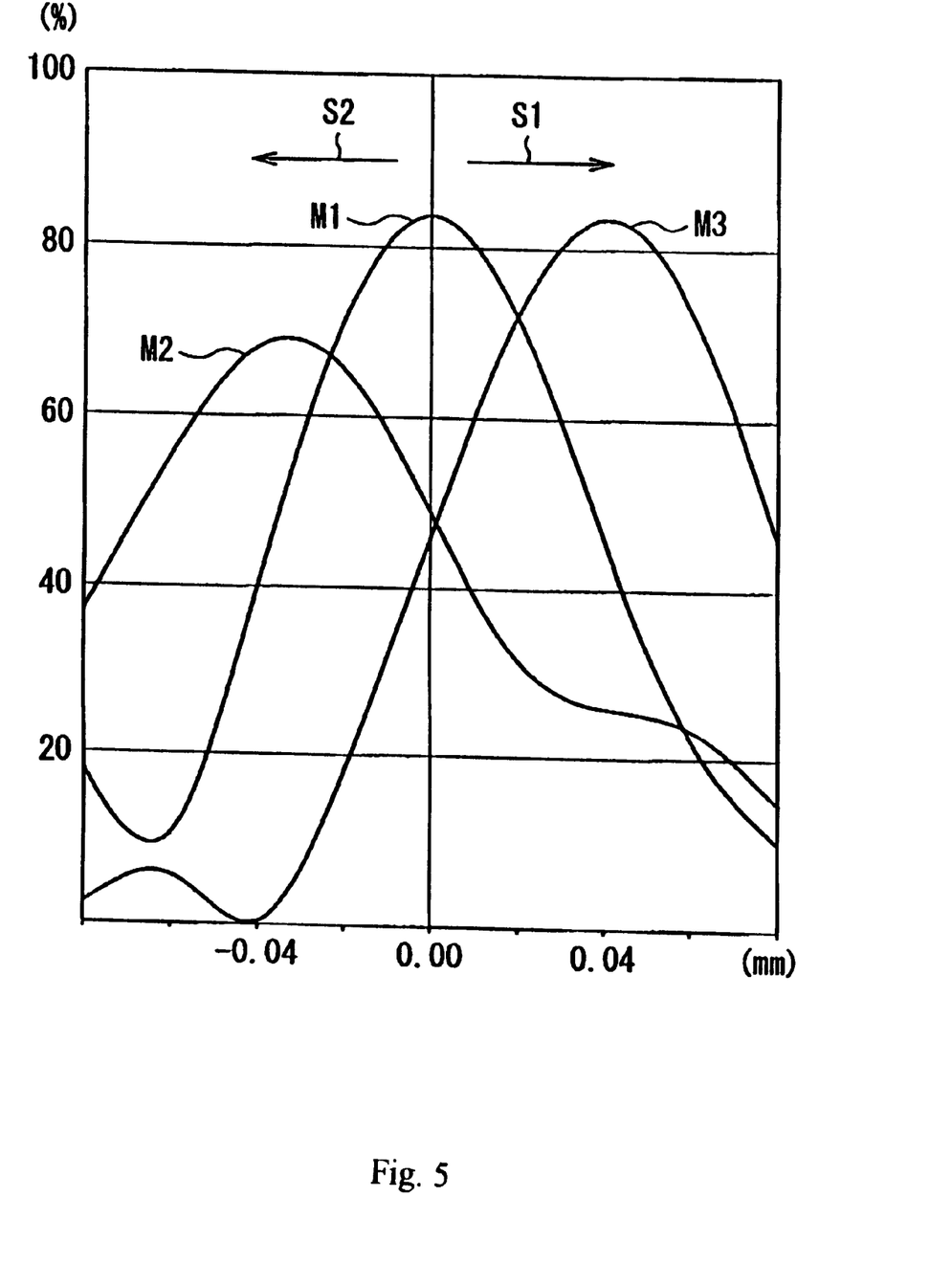
Figure 6:
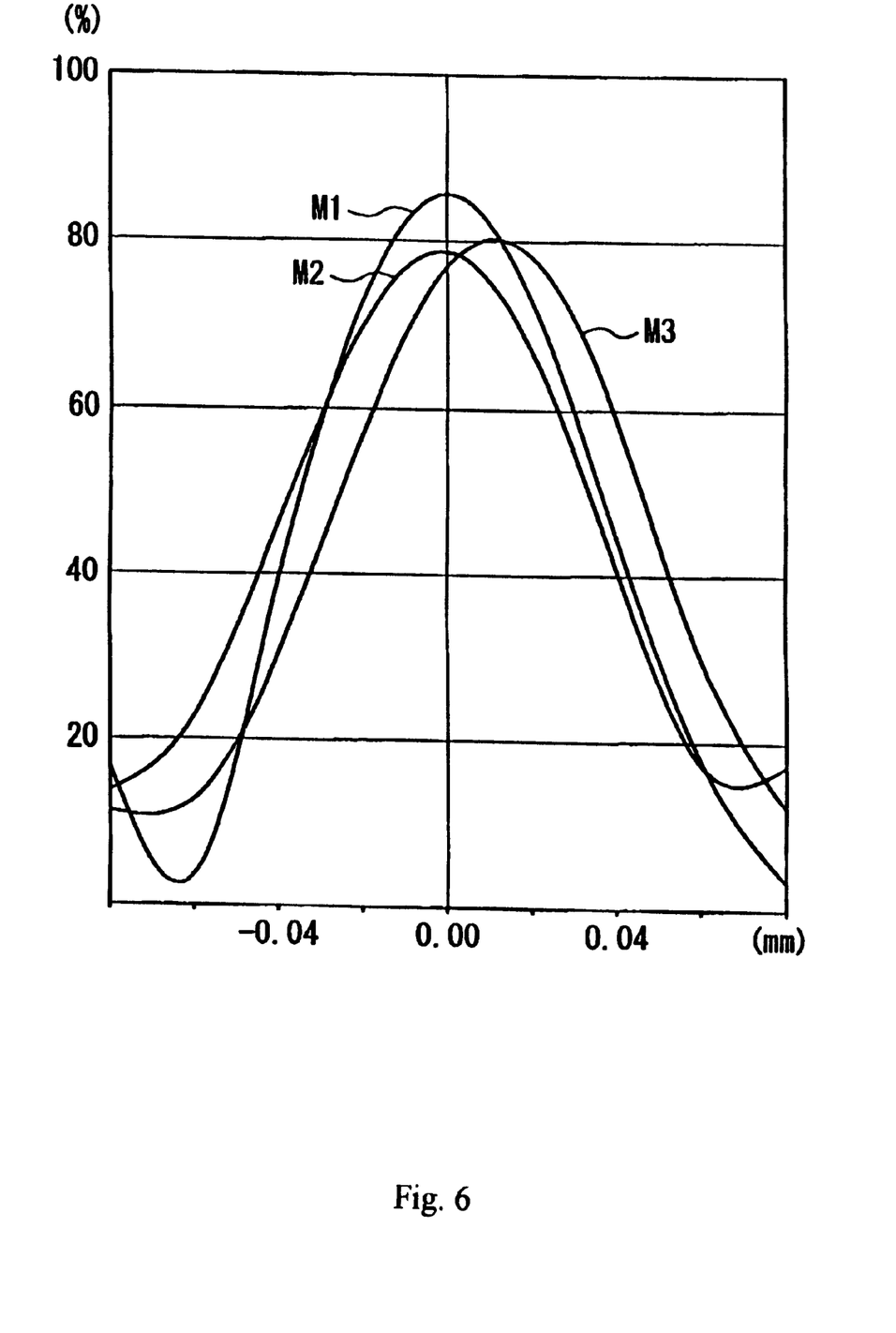

FIGS. 3–6 show how the image quality at the center and periphery of the captured image is affected by focus error under different conditions. More specifically, FIG. 3 shows the modulation transfer function MTF as a function of focusing error in the case where the cemented lens, formed of lens elements L5 and L6, of the image-capturing lens of Embodiment 1 has no components that are de-centered from the optical axis. The position "0.00" on the x-axis is the axial focus position (i.e., zero focusing error). Positive focusing error values indicate that the focus position is prior to the focus position for axial rays. Negative focusing error values indicate that the focus position is after the focus position for axial rays. FIGS. 4–6 show the modulation transfer function MTF as a function of focusing error when a portion or all of the cemented lens, formed of lens elements L5 and L6, of the image-capturing lens of Embodiment 1 is de-centered 0.02 mm from the optical axis. More specifically, FIG. 4 shows the MTF when the lens element L5 of the cemented lens is de-centered 0.02 mm. FIG. 5 shows the MTF when the lens element L6 of the cemented lens is de-centered 0.02 mm. FIG. 6 shows the MTF when the cemented lens as a whole is de-centered 0.02 mm. The lines labeled M1, M2, and M3 in these figures represent the MTF at the following field angles: 0% (i.e., on-axis), +70% (i.e., 70% of the maximum positive field angle), and −70% (i.e., 70% of the maximum negative field angle), respectively.

As shown in FIG. 3, where there is no de-centering, the MTF values all reach a maximum when the focusing error is zero. This is the optimum imaging condition.

As shown in FIG. 4, when only the lens element L5 of the cemented lens is de-centered 0.02 mm, the MTF on axis (i.e., curve M1) again is at maximum when the focusing error is zero. As before, this is the best focus condition. However, at a field angle of +70% (i.e. curve M2), the maximum (i.e., the best focus position) is shifted in the positive direction, as indicated by the arrow S1. At a field angle of −70% (curve M3), the maximum is shifted in the negative direction, as indicated by the arrow S2. Thus, the best focus positions for peripheral rays positioned at +70% and −70% of the maximum field angle, lie on opposite sides of the best focus for rays that form the center of the image field.

As shown in FIG. 5, when only the lens element L6 of the cemented lens is de-centered, the maximum of the MTF curve M1 again has a maximum at zero de-focusing. However, at a field angle of +70% (i.e. curve M2), the maximum (i.e., the best focus position) is shifted in the minus direction, as indicated by the arrow S2. At a field angle of −70% (curve M3), the maximum of the curve is shifted in the positive direction, as indicated by the arrow S1. Thus, the curves M2 and M3 of FIG. 5 are shifted in opposite directions from that of FIG. 4.

As mentioned above, the fifth and sixth lens elements L5 and L6 that form the cemented lens L5, L6 in the image-capturing lens of this embodiment have opposite sensitivities to being de-focused. Therefore, when the cemented lens L5, L6 is de-centered as a unit, the effects of the fifth lens element L5 and the sixth lens element L6 cancel each other. As a result, as shown in FIG. 6, all three curve maximums of curves M1, M2, and M3 (i.e. the positions of optimum focus) occur at nearly the same position. This is an indication that significant curvature of field resulting from de-centering the components of the cemented lens is avoided in the present invention. Thus, a high quality image is provided in the periphery of the image field by the present image-capturing lens.

Embodiment 2

Figure 7:
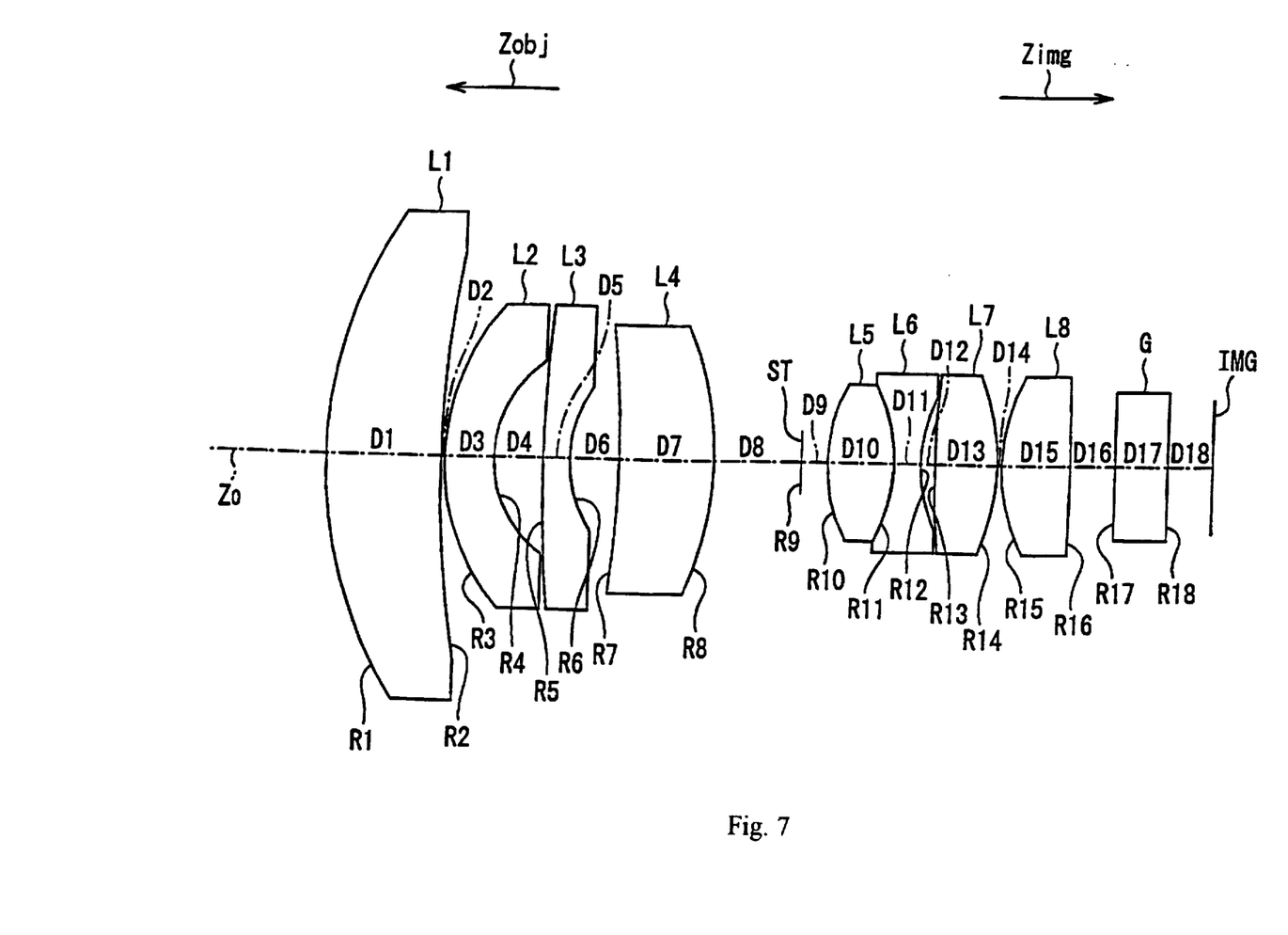
FIG. 7 shows the basic lens element configuration of the image-capturing lens according to Embodiment 2.

FIG. 7 shows the basic lens element configuration of this embodiment, which is similar to that shown in Embodiment 1. However, as evident from Table 2 below, the details of the lens construction data of this embodiment are different.

Table 2 below lists the surface number #, in order from the object side, the radius of curvature R (in mm) of each surface, the on-axis spacing D (in mm) between surfaces, as well as the index of refraction $N_d$ and the Abbe number $\nu_d$ (both at the d-line) of each optical element of the image-capturing lens of Embodiment 2. In the middle portion of the table are listed the focal length f, the F-number $F_{NO}$, the overall lens length Lt, and the back focus bf of the image-capturing lens, as well as the focal length f1 of the first lens element, the lateral magnifications $\beta 5$ and $\beta 6$ of the fifth and sixth lens elements, respectively, the height h1 of the principal ray at the first lens element of the front lens group, and the height h5 of the principal ray at the first lens elememt of the rear lens group. In the lower portion of the table are listed the values that correspond conditions (1)–(3) above.

TABLE 2

| # | R | D | $N_d$ | $\nu_d$ |
|---|---|---|---|---|
| 1 | 19.7106 | 5.20 | 1.833954 | 37.2 |
| 2 | 49.4265 | 0.20 | | |
| 3 | 10.2466 | 2.21 | 1.696775 | 55.5 |
| 4 | 5.2606 | 2.25 | | |
| 5 | 67.0899 | 1.20 | 1.785864 | 44.2 |

TABLE 2-continued

| # | R | D | $N_d$ | $v_d$ |
|---|---|---|---|---|
| 6 | 5.6246 | 2.30 | | |
| 7 | −43.9635 | 4.35 | 1.846587 | 23.8 |
| 8 | −14.3713 | 3.94 | | |
| 9 | ∞ (stop) | 1.20 | | |
| 10 | 7.2097 | 3.09 | 1.743966 | 44.8 |
| 11 | −7.2097 | 1.20 | 1.846587 | 23.8 |
| 12 | 6.799 | 0.65 | | |
| 13 | 42.4006 | 2.80 | 1.772469 | 49.6 |
| 14 | −10.3563 | 0.20 | | |
| 15 | 8.6182 | 3.10 | 1.804359 | 39.6 |
| 16 | −129.739 | 2.00 | | |
| 17 | ∞ | 2.45 | 1.516314 | 64.1 |
| 18 | ∞ | 1.99 | | |
| 19 | ∞ | 0.00 | | | f = 4.74   $F_{NO}$ = 2.8   Lt = 33.9   bf = 5.5
f1 = 36.2   β5 = 0.996   β6 = −1.113
h1 = −10.5   h5 = 0.47
Condition (1) value of (β5 + β6): 0.177
Condition (2) value of f1/(Lt + bf): 0.92
Condition (3) value of |h5/h1|: 0.045

As is apparent from comparing the above values with Conditions (1)–(3), this embodiment satisfies each of Conditions (1)–(3).

Figure 8A:
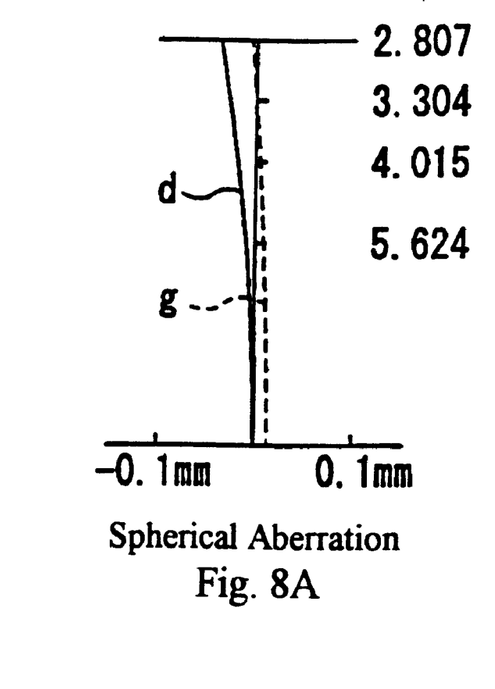
FIGS. 8A–8C show the spherical aberration, astigmatism, and distortion, respectively, of the image-capturing lens shown in FIG. 7.
Figure 8B:
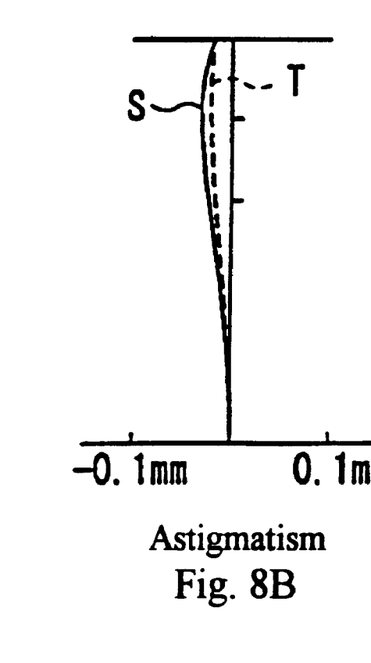
Figure 8C:
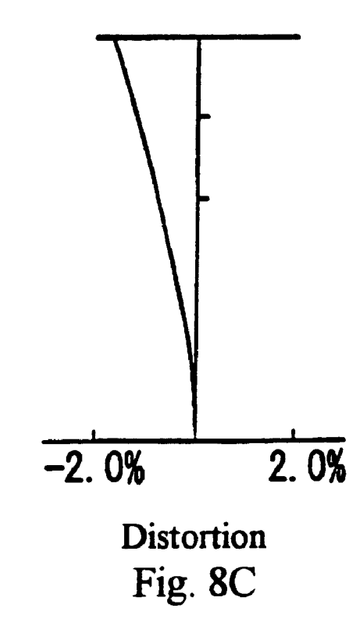

FIGS. 8A–8C show the spherical aberration, astigmatism, and distortion, respectively of the image-capturing lens of Embodiment 2. In FIG. 2A, the spherical aberration is shown for the d line (λ=587.6 nm) and the g line (λ=435.8 nm). In FIG. 2B, the astigmatism is shown for both the sagittal S and tangential T image planes. As is apparent from these figures, the spherical aberration, astigmatism and distortion are each favorably corrected so as to provide a high quality image-capturing lens.

The invention being thus described, it will be obvious that the same may be varied in many ways. For example, the radii of curvature R and surface spacings D may be readily scaled to achieve an image-capturing lens of a desired focal length. Further, the optical materials used for the lens elements may be appropriately varied by adjusting one or more of the radii of curvature and surface spacings, and the cover glass can be omitted. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An image-capturing lens comprising, in order from the object side:

a front lens group having negative refractive power; and
a rear lens group having positive refractive power and formed of the following lens elements, in sequential order from the most object side of the rear lens group,
a cemented lens formed of a first lens element that is biconvex and cemented to a second lens element that is biconcave,
a third lens element that is biconvex; and
a fourth lens element that is biconvex;

said rear lens group satisfying the following condition $|β5+β6| \leq 0.3$ where β5 is defined as equal to the product of (1−b5) (b6) (b7) (b8), and
β6 is defined as the product of (1−b6) (b7) (b8), with
b5 being the transverse magnification of the first lens element in the rear lens group,
b6 being the transverse magnification of the second lens element in the rear lens group,
b7 being the transverse magnification of the third lens element in the rear lens group, and
b8 being the transverse magnification of the fourth lens element in the rear lens group.

2. The image-capturing lens according to claim 1, said front lens group comprising, in order from the object side of the front lens group:

a first lens element of positive refractive power and a meniscus shape with its convex surface on the object side;
a second lens element of negative refractive power and a meniscus shape with its convex surface on the object side;
a third lens element that is biconcave, and
a fourth lens element of positive refractive power and a meniscus shape with its convex surface on the image side.

3. The image-capturing lens according to claim 2, wherein the following condition satisfied:

$0.5 \leq f1/(Lt+bf) \leq 1.5$ where f1 is the focal length of the first lens element in the front lens group;
Lt is the overall length of the image-capturing lens; and
bf is the back focus of the image-capturing lens.

4. The image-capturing lens according to claim 2, wherein a stop is positioned between the front and rear lens groups, and the following condition is satisfied:

$|h5/h1|<0.05$ where h5 is the height of the principal ray at the first lens element of the rear lens group, and
h1 is the height of the principal ray at the first lens element of the front lens group.

5. The image-capturing lens according to claim 3, wherein the following condition is also satisfied:

$|h5/h1|<0.05$ where h5 is the height of the principal ray at the first lens element of the rear lens group, and
h1 is the height of the principal ray at the first lens element of the front lens group.

* * * * *